US012779944B2

(12) United States Patent
Kim et al.

(10) Patent No.: US 12,779,944 B2
(45) Date of Patent: Nov. 3, 2026

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Jeawan Kim, Hwaseong-si (KR); Hochan An, Hwaseong-si (KR); Yeonho Kim, Hwaseong-si (KR); Hoyoung Jeong, Hwaseong-si (KR); Man Hee Park, Hwaseong-si (KR); Yeong Jun Kim, Hwaseong-si (KR); Jae Yeon Kim, Hwaseong-si (KR); Gwi Taek Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 146 days.

(21) Appl. No.: 18/798,467

(22) Filed: Aug. 8, 2024

(65) Prior Publication Data

US 2025/0196580 A1 Jun. 19, 2025

(30) Foreign Application Priority Data

Dec. 13, 2023 (KR) ........................ 10-2023-0180572

(51) Int. Cl.
*B60H 1/00* (2006.01)

(52) U.S. Cl.
CPC ................................ *B60H 1/00914* (2013.01)

(58) Field of Classification Search
CPC ............... B60H 1/00914; B60H 1/143; B60H 1/00899; B60H 1/32284; B60H 1/00385; B60H 1/22; B60H 1/32281; B60H 1/00885; B60H 1/3213; F28D 20/0034
See application file for complete search history.

(56) References Cited

U.S. PATENT DOCUMENTS

| | | | | |
|---|---|---|---|---|
| 11,745,562 | B1 * | 9/2023 | Lei | B60H 1/00899 62/160 |
| 11,760,154 | B2 * | 9/2023 | Miyoshi | B60H 1/00899 62/159 |
| 12,403,749 | B2 * | 9/2025 | Yamada | B60H 1/00314 |
| 2017/0021698 | A1 * | 1/2017 | Hatakeyama | B60H 1/143 |
| 2020/0164719 | A1 * | 5/2020 | Shiratori | B60H 1/143 |

OTHER PUBLICATIONS

Peng Xie et al., Thermal energy storage for electric vehicles at low temperatures: Concepts, systems, devices and materials, Renewable and Sustainable Energy Reviews; vol. 160, May 2022, p. 26.

Valeria Palomba et al., Thermal performance of a latent thermal energy storage for exploitation of renewables and waste heat: An experimental investigation based on an asymmetric plate heat exchanger, Energy Conversion and Management; vol. 200, Nov. 2019, p. 15.

* cited by examiner

*Primary Examiner* — Marc E Norman
(74) *Attorney, Agent, or Firm* — Lempia Summerfield Katz LLC

(57) ABSTRACT

A heat pump system for a vehicle includes an electrical component cooling apparatus and an air conditioner unit absorbing at least one of ambient air heat, a waste heat of electrical components, or the heat supplied from a heat storage device. The heat pump system is configured to efficiently heat the vehicle interior by using the high-temperature coolant.

19 Claims, 7 Drawing Sheets

HEAT PUMP SYSTEM FOR A VEHICLE

CROSS-REFERENCE TO RELATED APPLICATION

This application claims priority to and the benefit of Korean Patent Application No. 10-2023-0180572, filed on Dec. 13, 2023, the entire contents of which are incorporated herein by reference.

BACKGROUND

(a) Field

The present disclosure relates to a heat pump system for a vehicle. More particularly, the present disclosure relates to a heat pump system for a vehicle interconnected with an air conditioner unit through which a refrigerant circulates.

(b) Description of the Related Art

Generally, an air conditioning system for a vehicle includes an air conditioner unit circulating a refrigerant in order to heat and cool an interior of the vehicle.

The air conditioner unit is used to maintain the interior of the vehicle at an appropriate temperature regardless of a change in an external temperature to maintain a comfortable interior environment. In particular, the air conditioner unit is configured to heat and cool the interior of the vehicle by exchanging heat between a condenser and an evaporator in a process in which a refrigerant discharged by driving a compressor is circulated back to the compressor through the condenser, a receiver drier, an expansion valve, and the evaporator.

In other words, the air conditioner unit lowers a temperature and a humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Environment-friendly technology becomes a core technology of a future automobile industry, and advanced car makers have focused their energy on the development of environmentally-friendly vehicles to meet environmental and fuel efficiency regulations.

Recently, in accordance with a continuously increased interest in energy efficiency and environmental pollution, the development of an environmentally-friendly vehicle capable of substantially substituting for an internal combustion engine vehicle is desired. Environmentally-friendly vehicles are classified into electric vehicles driven using a fuel cell or electricity as a power source and hybrid vehicles driven using an engine and a battery.

Electric vehicles use, as primary power source, a battery module in which a plurality of rechargeable batteries (i.e., cells) capable of charging and discharging are formed into one pack, and therefore, does not produce the exhaust gas and its noise is very small.

An air conditioning apparatus applied to such an environment-friendly vehicle is typically referred to as a heat pump system.

However, when heating of the vehicle interior is required, an electric vehicle applied with a heat pump system mainly uses an electric heater due to insufficiency of heat sources, and accordingly, there is a drawback in that the heating performance is deteriorated, power consumption of the compressor is increased, and consumption of the battery is highly increased due to usage of the electric heater.

In addition, there is a disadvantage that the overall driving distance of the vehicle is shortened due to excessive usage of the battery, and accordingly, the overall marketability of the electric vehicle is deteriorated.

The above information disclosed in this Background section is provided only to enhance understanding of the background of the present disclosure, and therefore it may contain information that does not form the prior art that is already known to a person of ordinary skill in the art.

SUMMARY

The present disclosure provides a heat pump system for a vehicle connected to an air conditioner unit absorbing at least one of the ambient air heat, the waste heat of electrical components, and the heat supplied from a heat storage device, and thus the heat pump system is configured to efficiently heat the vehicle interior by using the high-temperature coolant.

In one embodiment of the present disclosure, a heat pump system for a vehicle may include an electrical component cooling apparatus including a radiator and a first water pump connected via a first coolant line configured to flow a first coolant to cool an electrical component or recollect a waste heat of the electrical component. The electrical component cooling apparatus may further include a heat storage device and a second water pump connected to a second coolant line selectively connected to the first coolant line and configured to flow the first coolant. The heat pump system may further include: an air conditioner unit including a compressor, a first heat-exchanger, an expansion valve, and a second heat-exchanger connected to a refrigerant line configured to flow a refrigerant; and a vehicle interior heating device including a heater core and a third water pump connected to a third coolant line configured to flow a second coolant. In particular, the first heat-exchanger is provided on the third coolant line and configured to flow the second coolant and condense the refrigerant through heat-exchange with the second coolant. The second heat-exchanger is connected to the second coolant line and configured to flow the first coolant and evaporate the refrigerant through heat-exchange with the first coolant. A flow of the first coolant is controlled depending on at least one mode for storing heat in the heat storage device or heating a vehicle interior of the vehicle.

The electrical component cooling apparatus may further include: a branch line connected to the first coolant line between the radiator and the first water pump through a first valve provided on the first coolant line between the radiator and the first water pump, a second valve provided between the first coolant line and the second coolant line to selectively connect the first coolant line and the second coolant line, and a first connection line having a first end connected to the second valve and a second end connected to a location where the first coolant line and the second coolant line meet between the electrical component and the second water pump. The electrical component cooling apparatus may further include: a third valve provided on the first coolant line at a downstream end of the electrical component, and a second connection line having a first end connected to the third valve, and a second end connected to the second coolant line between the heat storage device and the second heat-exchanger.

When a waste heat generated from the electrical component is sufficient, or when the temperature of the first coolant is to be increased by using both the waste heat of the electrical component and the heat of the heat storage device, the first valve may be configured to close the first coolant line connected to the radiator and open the branch line.

When the temperature of the first coolant is to be increased by using the heat stored in the heat storage device, the second valve may be configured to open the first connection line and close the first coolant line connecting the radiator and the second valve, such that the second coolant line may form an independent closed circuit through which the first coolant circulates through the first connection line.

When a temperature of the heat stored in the heat storage device is lower than a predetermined temperature, or when the heat storage device has completely exhausted the stored heat, the third valve may be configured to open the second connection line and close a partial first coolant line and a partial second coolant line connecting the third valve and the heat storage device such that the first coolant may not flow to the heat storage device.

The first valve, the second valve, and the third valve may be 3-way valves capable of distributing a flow amount, while controlling a flow movement, of the first coolant.

The at least one mode may include a first mode in which the heat stored in the heat storage device is supplied to the air conditioner unit and the vehicle interior is heated using the heat supplied from the air conditioner unit, and a second mode in which the waste heat of the electrical component and the heat stored in the heat storage device is supplied to the air conditioner unit and the vehicle interior is heated using the heat supplied from the air conditioner unit. The at least one mode may further include: a third mode in which an ambient air heat, the waste heat of the electrical component, and the heat stored in the heat storage device is supplied to the air conditioner unit and the vehicle interior is heated using the heat supplied from the air conditioner unit, and a fourth mode in which the waste heat of the electrical component is supplied to the air conditioner unit and the vehicle interior is heated using the heat supplied from the air conditioner unit. The at least one mode may further include: a fifth mode in which the ambient air heat and the waste heat of the electrical component is supplied to the air conditioner unit and the vehicle interior is heated using the heat supplied from the air conditioner unit, and a sixth mode for storing heat in the heat storage device.

In the first mode, the first coolant line may not be connected to the second coolant line by an operation of the second valve, an operation of the first water pump may be stopped such that the first coolant may not flow along the first coolant line, the branch line may be closed by an operation of the first valve, the first connection line may be opened by the operation of the second valve such that the second coolant line and the first connection line may be interconnected to form an independent closed circuit through which the first coolant circulates, the second connection line may be closed by an operation of the third valve, the second water pump may be operated such that the first coolant may flow along the second coolant line and the first connection line, the air conditioner unit may be operated, the third water pump in the vehicle interior heating device may be operated such that the second coolant may flow along the third coolant line, the heat stored in the heat storage device may increase the temperature of the first coolant flowing along the second coolant line and the first connection line, the second heat-exchanger may recollect the heat of the heat storage device while evaporating the refrigerant supplied from the expansion valve through heat-exchange with the first coolant introduced through the second coolant line, and the first heat-exchanger may increase the temperature of the second coolant by heat-exchanging the refrigerant with the second coolant introduced through the third coolant line such that a high-temperature second coolant may be supplied to the heater core.

The first mode may be operated when temperature of the heat storage device is higher than a heating target temperature.

In the second mode, a partial first coolant line may be closed by an operation of the first valve connected to the radiator such that the first coolant may not flow to the radiator, the branch line may be opened by the operation of the first valve, the first coolant line and the second coolant line may be interconnected by an operation of the second valve and the third valve, the first connection line may be closed by an operation of the second valve, the second connection line may be closed by the operation of the third valve, the first coolant line and the second coolant line may be interconnected through the opened branch line to form an independent closed circuit through which the first coolant circulates, the first water pump and the second water pump may be operated such that the first coolant may circulate along the branch line, the opened first coolant line, and the second coolant line, the air conditioner unit may be operated, in the vehicle interior heating device, the third water pump may be operated such that the second coolant may flow along the third coolant line, the waste heat of the electrical component and the heat stored in the heat storage device may increase the temperature of the first coolant flowing along the opened first coolant line, the second coolant line, and the branch line, the second heat-exchanger may recollect the waste heat of the electrical component and the heat of the heat storage device while evaporating the refrigerant supplied from the expansion valve through heat-exchange with the first coolant introduced through the second coolant line, and the first heat-exchanger may increase the temperature of the second coolant by exchanging heat between the refrigerant and the second coolant introduced through the third coolant line such that a high-temperature second coolant may be supplied to the heater core.

The second mode may be operated when a temperature of the heat storage device is higher than the temperature of the first coolant discharged from the electrical component and the temperature of the first coolant introduced into the radiator is higher than an external temperature.

In the third mode, the first coolant line and the second coolant line may be interconnected by an operation of the second valve and the third valve, the branch line may be closed by an operation of the first valve, the first connection line may be closed by an operation of the second valve, the second connection line may be closed by the operation of the third valve, the first water pump and the second water pump may be operated such that the first coolant may circulate along the first coolant line and the second coolant line, the air conditioner unit may be operated, in the vehicle interior heating device, the third water pump may be operated such that the second coolant may flow along the third coolant line, the ambient air heat absorbed at the radiator, the waste heat of the electrical component, and the heat stored in the heat storage device source may increase the temperature of the first coolant flowing along the opened first coolant line, the second coolant line, and the branch line, the second heat-exchanger may recollect the ambient air heat, the waste heat of the electrical component, and the heat of the heat storage device while evaporating the refrigerant supplied from the expansion valve through heat-exchange with the first coolant introduced through the second coolant line, the first heat-exchanger may increase the temperature of the second coolant by heat-exchanging the refrigerant with the second coolant introduced through the third coolant line such that a high-temperature second coolant may be supplied to the heater core.

The third mode may be operated when a temperature of the heat storage device is higher than the temperature of the first coolant discharged from the electrical component and the temperature of the first coolant introduced into the radiator is lower than an external temperature.

In the fourth mode, a partial first coolant line may be closed by an operation of the first valve connected to the radiator such that the first coolant may not flow to the radiator, the branch line may be opened by the operation of the first valve, a partial second coolant line connected to the second heat-exchanger may be opened by an operation of the second valve to be connected to the first coolant line, the partial first coolant line and the second coolant line connecting from the third valve to a second end of the second connection line may be closed by an operation of the third valve, the first connection line may be closed by the operation of the second valve, the second connection line may be opened by the operation of the third valve, the partial first coolant line and the partial second coolant line is interconnected with the branch line through the second connection line and forms an independent closed circuit through which the first coolant circulates, the first water pump may be operated such that the first coolant may circulate along the opened first coolant line, the opened second coolant line, the branch line, and the second connection line, the air conditioner unit may be operated, in the vehicle interior heating device, the third water pump may be operated such that the second coolant may flow along the third coolant line, the waste heat of the electrical component may increase the temperature of the first coolant flowing along the opened first coolant line, the opened second coolant line, the branch line and the second connection line, the second heat-exchanger may recollect the waste heat of the electrical component while evaporating the refrigerant supplied from the expansion valve through heat-exchange with the first coolant introduced through the second coolant line, and the first heat-exchanger may increase the temperature of the second coolant by heat-exchanging the refrigerant with the second coolant introduced through the third coolant line such that a high-temperature second coolant may be supplied to the heater core.

The fourth mode may be operated when the heat stored in the heat storage device source is completely exhausted, or when a temperature of the heat storage device is lower than the temperature of the first coolant discharged from the electrical component and the temperature of the first coolant introduced into the radiator is higher than an external temperature.

In the fifth mode, a partial second coolant line connected to the second heat-exchanger may be opened by an operation of the second valve to be connected to the first coolant line, a partial first coolant line and the second coolant line connecting from the third valve to a second end of the second connection line are closed by an operation of the third valve, the branch line may be closed by an operation of the first valve, the first connection line may be closed by the operation of the second valve, the second connection line may be opened by the operation of the third valve, the first coolant line and the partial second coolant line may be interconnected through the second connection line and form an independent closed circuit through which the first coolant circulates, the first water pump may be operated such that the first coolant may circulate along the first coolant line, the opened second coolant line, and the second connection line, the air conditioner unit may be operated, in the vehicle interior heating device, the third water pump may be operated such that the second coolant may flow along the third coolant line, the ambient air heat absorbed at the radiator and the waste heat of the electrical component may increase the temperature of the first coolant flowing along the first coolant line, the opened second coolant line, and the second connection line, the second heat-exchanger may recollect the ambient air heat and the waste heat of the electrical component while evaporating the refrigerant supplied from the expansion valve through heat-exchange with the first coolant introduced through the second coolant line, and the first heat-exchanger may increase the temperature of the second coolant by heat-exchanging the refrigerant with the second coolant introduced through the third coolant line such that a high-temperature second coolant may be supplied to the heater core.

The fifth mode may be operated when the heat stored in the heat storage device source is completely exhausted, or when a temperature of the heat storage device is lower than the temperature of the first coolant discharged from the electrical component and the temperature of the first coolant introduced into the radiator is lower than an external temperature.

In the sixth mode, a partial first coolant line and a partial second coolant line connecting from the third valve to a second end of the second connection line are opened by an operation of the third valve, the partial second coolant line connected to the second heat-exchanger, the first coolant line connecting the radiator and the second valve, and the first coolant line connecting the radiator and the third valve are closed, the branch line may be closed by an operation of the first valve, the first connection line may be closed by an operation of the second valve, the second connection line may be opened by the operation of the third valve, an operation of the first water pump may be stopped such that the first coolant may not flow along the first coolant line, the second water pump may be operated such that the first coolant may circulate along the opened second coolant line and the second connection line, an operation of the air conditioner unit is stopped, and an operation of the vehicle interior heating device is stopped.

The electrical component cooling apparatus may further include a coolant heater provided on the second coolant line between the second water pump and the second heat-exchanger.

When heat storage of the heat storage device is required, or when heat stored in the heat storage device is insufficient in the at least one mode, the coolant heater may be operated to heat the first coolant flowing along the second coolant line.

The heat storage device may be filled with a phase-change material.

As described above, according to a heat pump system for a vehicle according to an embodiment, the temperature of the coolant may be increased by using at least one of the ambient air heat, the waste heat of electrical components, and the heat supplied from an air conditioner unit configured to absorb the heat supplied from a heat storage device, and the vehicle interior may be efficiently heated by using the coolant whose temperature is increased.

In addition, according to the present disclosure, the heating performance may be maximized while minimizing the number of required components, by using the ambient air heat, the waste heat of electrical components, and the heat stored in the heat storage device selectively, and therefore, streamlining and simplification of the system may be achieved.

In addition, according to the present disclosure, since usage of the electric heater may be minimized at the time of heating the vehicle interior, the consumption of the battery may be reduced, and the overall travel distance of the vehicle may be increased.

In addition, according to the present disclosure, through streamlining of an entire system, it is possible to reduce manufacturing cost and weight and improve space utilization.

Figure 1:
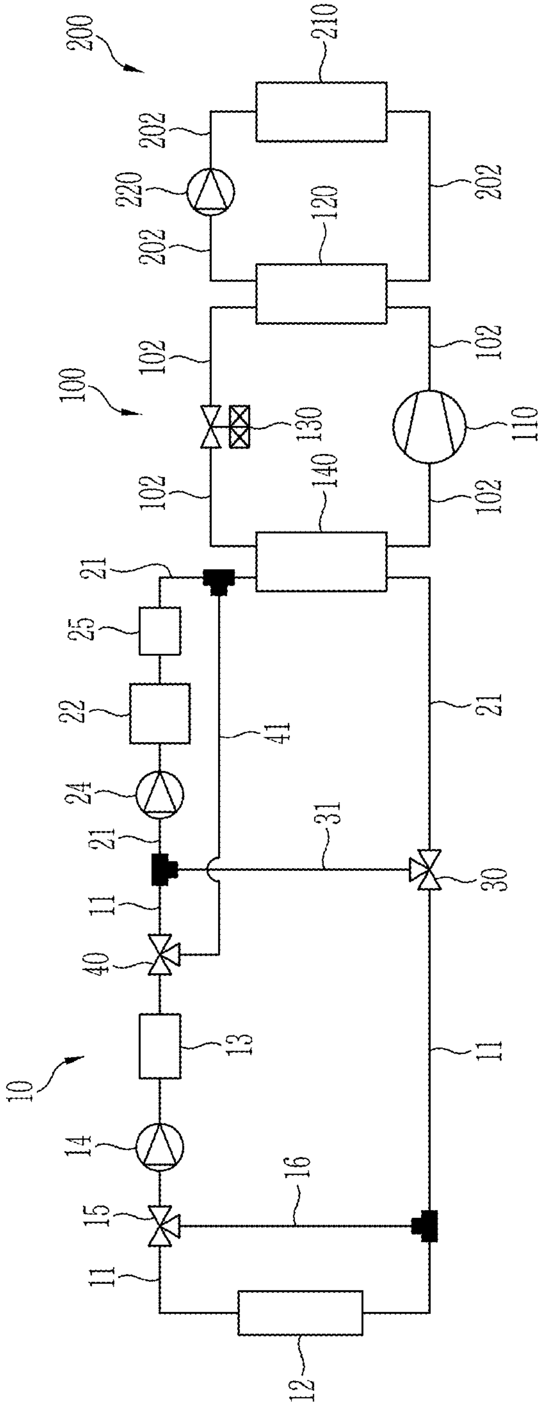
FIG. 1 is a block diagram illustrating a heat pump system for a vehicle according to an embodiment.

The drawings described herein are for illustration purposes only and are not intended to limit the scope of the present disclosure in any way.

DETAILED DESCRIPTION

Some embodiments are hereinafter described in detail with reference to the accompanying drawings.

Embodiments disclosed in the present specification and the constructions depicted in the drawings are only exemplary embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted, and the same elements or equivalents are referred to with the same reference numerals throughout the specification.

The size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word “comprise” and variations such as “comprises” or “comprising”, should be understood to imply the inclusion of stated elements but not the exclusion of any other elements. The same is true for terms such as “have,” “include,” and the like.

Furthermore, terms, such as “ . . . unit”, “ . . . means”, “ . . . portions”, “ . . . part”, and “ . . . member” described in the specification, mean a unit of a comprehensive element that performs at least one function or operation.

When a component, device, element, or the like of the present disclosure is described as having a purpose or performing an operation, function, or the like, the component, device, or element should be considered herein as being “configured to” meet that purpose or perform that operation or function.

FIG. 1 is a block diagram illustrating a heat pump system for a vehicle according to an embodiment.

The heat pump system may be connected to an air conditioner unit 100 configured to absorb at least one of an ambient air heat, a waste heat of an electrical component 13, or a heat supplied from a heat storage device 22, and a vehicle interior may be efficiently heated by using a high-temperature coolant.

For such a purpose, the heat pump system according to an embodiment may include an electrical component cooling apparatus 10, the air conditioner unit 100, and the vehicle interior heating device 200.

Referring to FIG. 1, the air conditioner unit 100 may include a compressor 110, a first heat-exchanger 120, an expansion valve 130, and a second heat-exchanger 140 connected via a refrigerant line 102 configured to flow a refrigerant.

The compressor 110 may compress the refrigerant introduced via the refrigerant line 102 and may discharge the compressed refrigerant to the refrigerant line 102.

The first heat-exchanger 120 may condense the refrigerant introduced from the compressor 110 via the refrigerant line 102 through heat-exchange with the operation fluid.

The expansion valve 130 may expand the refrigerant introduced from the first heat-exchanger 120 through the refrigerant line 102.

In addition, the second heat-exchanger 140 may evaporate the refrigerant introduced from the expansion valve 130 via the refrigerant line 102 through heat-exchange with the operation fluid.

The refrigerant evaporated at the second heat-exchanger 140 may be introduced into the compressor 110 along the refrigerant line 102. In other words, the air conditioner unit 100 may circulate the refrigerant while repeatedly performing the above-described processes, and may supply the thermal energy generated during the phase change of the refrigerant to the vehicle interior heating device 200 connected to the first heat-exchanger 120.

In one embodiment, the electrical component cooling apparatus 10 may include a radiator 12, the electrical component 13, and a first water pump 14 connected via a first coolant line 11.

The radiator 12 may be disposed in the front of the vehicle, and a cooling fan may be provided in the rear of the vehicle. Accordingly, the radiator 12 may cool a first coolant through an operation of the cooling fan and heat-exchange with the ambient air.

Here, the electrical component 13 may include at least one of a power control apparatus, an inverter, or an on-board charger (OBC). The power control apparatus or the inverter may generate heat while the vehicle is driving, and the charger may generate heat when charging the battery module.

In other words, the electrical component cooling apparatus 10 may circulate the first coolant cooled at the radiator 12 along the first coolant line 11 through an operation of the first water pump 14, and thereby may cool the electrical component 13 to avoid or prevent overheating.

In addition, the electrical component cooling apparatus 10 may circulate the first coolant along the first coolant line 11 through the operation of the first water pump 14, in order to recollect the ambient air heat by using the radiator 12, or may cool the electrical component 13 or recollect the waste heat of the electrical component 13.

In another embodiment, the electrical component cooling apparatus 10 may further include: a branch line 16, the heat storage device 22, and a second water pump 24 connected via a second coolant line 21 selectively connected to the first coolant line 11 and configured to flow the first coolant.

The branch line 16 may be connected to the first coolant line 11 between the radiator 12 and the first water pump 14 through a first valve 15 provided on the first coolant line 11 between the radiator 12 and the first water pump 14.

In more detail, a first end of the branch line 16 may be connected to the first coolant line 11 through the first valve 15. A second end of the branch line 16 may be connected to the first coolant line 11, at an upstream end of the radiator 12.

The upstream end of the radiator 12 and a downstream end of the radiator 12 may be set based on a flow direction of the first coolant.

In other words, based on the direction in which the first coolant flows along the first coolant line 11, a location at which the first coolant is introduced into the radiator 12 may be define as the upstream end of the radiator 12, and a location at which the first coolant is discharged from the radiator 12 may be define as the downstream end of the radiator 12.

Here, when the waste heat generated from the electrical component 13 is sufficient, or when the temperature of the first coolant is to be increased by using both the waste heat of the electrical component 13 and the heat of the heat storage device 22, the first valve 15 may close the first coolant line 11 connected to the radiator 12 and may open the branch line 16.

To the contrary, the first valve 15 may open the first coolant line 11 connected to the radiator 12 and close the branch line 16 i) when the first valve 15 supplies the first coolant cooled at the radiator 12 to the electrical component 13, or ii) when the ambient air heat is to be absorbed through the radiator 12.

In the present embodiment, the heat storage device 22 may be provided on the second coolant line 21 and may be filled with a phase-change material.

Here, the phase-change materials may be used for the purpose of storing the energy or constantly maintaining the temperature by using the large heat absorption and dissipation effect of the latent heat that absorbs or dissipates heat when a thermodynamic process of changing between different states (i.e., gas, liquid, and solid states according to the temperature and pressure) is performed on the material.

In the present embodiment, the phase-change material may be applied in order to increase the temperature of the first coolant by using the absorbed thermal energy.

In addition, the second water pump 24 may be provided on the second coolant line 21. The second water pump 24 may be selectively operated in order to flow the first coolant through the second coolant line 21.

Here, the second heat-exchanger 140 may be connected to the second coolant line 21 and flow the first coolant, so as to evaporate the refrigerant through heat-exchange with the first coolant.

In one embodiment, the electrical component cooling apparatus 10 may further include a coolant heater 25 provided on the second coolant line 21 between the heat storage device 22 and the second heat-exchanger 140.

The coolant heater 25 may be operated when the temperature of the first coolant passing through the second heat-exchanger 140 is lower than a target temperature, and may heat the first coolant flowing through the second coolant line 21. Accordingly, the first coolant, whose temperature is increased while passing through the coolant heater 25, may be supplied to the second heat-exchanger 140.

In more detail, when storing heat in the heat storage device 22 is required, or when the heat of the heat storage device 22 is insufficient in at least one mode for heating the vehicle interior, the coolant heater 25 may be operated to heat the first coolant flowing to the second heat-exchanger 140 along the second coolant line 21.

In other words, the coolant heater 25 may be selectively operated when the temperature of the first coolant supplied to the second heat-exchanger 140 needs to be increased.

The electrical component cooling apparatus 10 may further include a second valve 30, a first connection line 31, a third valve 40, and a second connection line 41.

The second valve 30 may be provided between the first coolant line 11 and the second coolant line 21 to selectively connect the first coolant line 11 and the second coolant line 21.

A first end of the first connection line 31 may be connected to the second valve 30. A second end of the first connection line 31 may be connected to a location where the first coolant line 11 and the second coolant line 21 meet between the electrical component 13 and the second water pump 24.

Accordingly, the second valve 30 may be selectively operated to interconnect the first coolant line 11 and the second coolant line 21 or to open or close the first connection line 31.

When the first connection line 31 is opened, one of the first coolant line 11 or the second coolant line 21 may form an independent closed circuit through which the first coolant circulates.

In more detail, when the temperature of the first coolant is to be increased by using the heat stored in the heat storage device 22, the second valve 30 may open the first connection line 31 such that the second coolant line 21 may form an independent closed circuit through which the first coolant circulates through the first connection line 31. At the same time, the second valve 30 may close the first coolant line 11 that connect the radiator 12 and the second valve 30.

In the present embodiment, the third valve 40 may be provided on the first coolant line 11, at a downstream end of the electrical component 13.

Here, an upstream end of the electrical component 13 and the downstream end of the electrical component 13 may be set based on the flow direction of the first coolant.

In other words, based on the direction in which the first coolant flows along the first coolant line 11, a location at which the first coolant is introduced into the electrical component 13 may be define as the upstream end of the electrical component 13, and a location at which the first coolant is discharged from the electrical component 13 may be define as the downstream end of the electrical component 13.

In addition, a first end of the second connection line 41 may be connected to the third valve 40. A second end of the second connection line 41 may be connected to the second coolant line 21 between the heat storage device 22 and the second heat-exchanger 140.

Here, when the temperature of the heat stored in the heat storage device 22 is lower than a predetermined temperature, or when the heat storage device 22 has completely exhausted the stored heat, the third valve 40 may open the second connection line 41 such that the first coolant may not flow to the heat storage device 22.

Simultaneously, the third valve 40 may close a partial first coolant line 11 and a partial second coolant line 21 that connect the first valve 15 and the heat storage device 22.

In order to store heat in the heat storage device 22, the third valve 40 may open the second connection line 41, and may open the first coolant line 11 and the second coolant line 21 connecting the third valve 40 and the second end of the second connection line 41.

The first valve 15, the second valve 30, and the third valve 40 may each be a 3-way valve capable of distributing a flow amount while controlling a flow of the first coolant.

In addition, the vehicle interior heating device 200 may include a heater core 210 and a third water pump 220 connected through a third coolant line 202 configured to flow the second coolant.

The heater core 210 may be provided on the third coolant line 202. The heater core 210 may be provided inside a heating, ventilation, and air conditioning (HVAC) module (not shown).

The third water pump 220 may be provided on the third coolant line 202.

The third water pump 220 may be selectively operated in order to flow the second coolant along the third coolant line 202.

Here, the first heat-exchanger 120 may be provided on the third coolant line 202 between the heater core 210 and the third water pump 220 to condense the refrigerant through heat-exchange with the second coolant. Accordingly, the second coolant may flow through the first heat-exchanger 120 along the third coolant line 202.

Then, the first heat-exchanger 120 may condense the refrigerant while exchanging heat between the introduced second coolant and the refrigerant introduced from the compressor 110 through the refrigerant line 102.

Simultaneously, the first heat-exchanger 120 may discharge the second coolant, whose temperature is increased, to the third coolant line 202 while being heat-exchanged with the refrigerant.

In other words, the second coolant, whose temperature is increased while condensing the refrigerant in the first heat-exchanger 120, may be supplied to the heater core 210 along the third coolant line 202. Accordingly, a high-temperature second coolant supplied to the heater core 210 through the third coolant line 202 may increase the temperature of the ambient air passing through the heater core 210.

In other words, the ambient air introduced into the HVAC module may be converted into the high-temperature state while passing through the heater core 210 and then introduced into the vehicle interior, thereby heating the vehicle interior.

In the heat pump system, the flow of the first coolant may be controlled depending on at least one mode for storing heat in the heat storage device 22, or for heating the vehicle interior.

Here, the at least one mode may include a first mode to a sixth mode.

In the first mode, the heat stored in the heat storage device 22 may be supplied to the air conditioner unit 100, and the vehicle interior may be heated by using the heat supplied from the air conditioner unit 100.

In the second mode, the waste heat of the electrical component 13 and the heat stored in the heat storage device 22 may be supplied to the air conditioner unit 100, and the vehicle interior may be heated by using the heat supplied from the air conditioner unit 100.

In the third mode, the ambient air heat, the waste heat of the electrical component 13, and the heat stored in the heat storage device 22 may be supplied to the air conditioner unit 100, and the vehicle interior may be heated by using the heat supplied from the air conditioner unit 100.

In the fourth mode, the waste heat of the electrical component 13 may be supplied to the air conditioner unit 100, and the vehicle interior may be heated by using the heat supplied from the air conditioner unit 100.

In the fifth mode, the ambient air heat and the waste heat of the electrical component 13 may be supplied to the air conditioner unit 100, and the vehicle interior may be heated by using the heat supplied from the air conditioner unit 100.

In addition, in the sixth mode, heat may be stored in the heat storage device 22.

Hereinafter, an operation and action of a heat pump system for a vehicle according to an embodiment configured as described above is described in detail with reference to FIG. 2 to FIG. 7.

According to an embodiment, in a heat pump system for a vehicle, the operation in the first mode for supplying the heat stored in the heat storage device 22 to the air conditioner unit 100 and for heating the vehicle interior by using the heat supplied from the air conditioner unit 100 is described with reference to FIG. 2.

Figure 2:
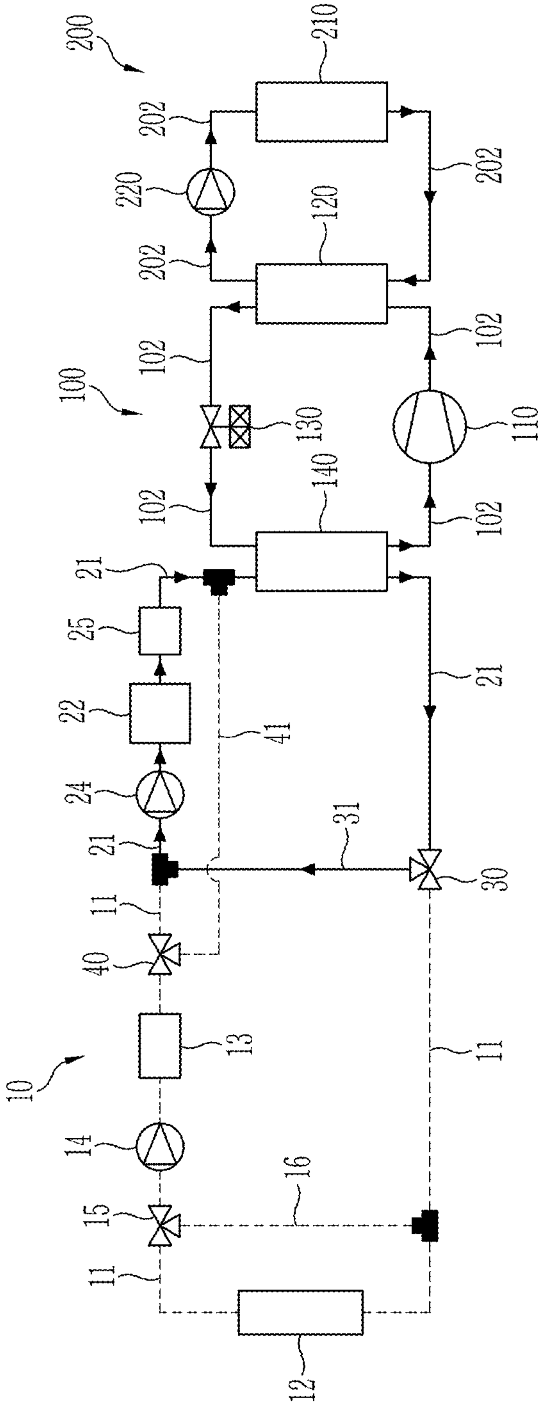
FIG. 2 is an operation diagram of a first mode in a heat pump system for a vehicle according to an embodiment.

FIG. 2 is an operation diagram of the first mode in a heat pump system for a vehicle according to an embodiment.

Referring to FIG. 2, in the first mode, the first coolant line 11 may not be connected to the second coolant line 21 by an operation of the second valve 30.

Here, the operation of the first water pump may be stopped such that the first coolant may not flow along the first coolant line 11.

The branch line 16 may be closed by an operation of the first valve 15.

Meanwhile, the first connection line 31 may be opened by the operation of the second valve 30 such that the second coolant line 21 and the first connection line 31 may be interconnected to form an independent closed circuit through which the first coolant circulates.

In addition, the second connection line 41 may be closed by an operation of the third valve 40.

In such a state, the second water pump 24 may operate such that the first coolant may flow along the second coolant line 21 and the first connection line 31. Then, the first coolant may flow along the second coolant line 21 and the first connection line 31.

In the air conditioner unit 100, the compressor 110 may operate such that the refrigerant may circulate along the refrigerant line 102.

Simultaneously, in the vehicle interior heating device 200, the third water pump 220 may operate such that the second coolant may flow along the third coolant line 202.

Then, the heat stored in the heat storage device 22 may increase the temperature of the first coolant flowing along the second coolant line 21 and the first connection line 31.

In other words, the first coolant may absorb heat from the heat storage device 22 while passing through the heat storage device 22, thereby increasing its temperature. Through such an operation, the first coolant, whose temperature is increased, may be supplied to the second heat-exchanger 140.

Here, the second heat-exchanger 140 may recollect the heat of the heat storage device 22 while evaporating the refrigerant supplied from the expansion valve 130 through heat-exchange with the first coolant introduced through the second coolant line 21.

The refrigerant evaporated at the second heat-exchanger 140 may be introduced into the compressor 110 along the refrigerant line 102. The introduced refrigerant may be compressed by an operation of the compressor 110.

The refrigerant compressed at the compressor 110 may be supplied to the first heat-exchanger 120. At this time, the first heat-exchanger 120 may increase the temperature of the second coolant by heat-exchanging the refrigerant with the second coolant introduced through the third coolant line 202 such that the high-temperature second coolant may be supplied to the heater core 210.

The second coolant whose temperature is increased while passing through the first heat-exchanger 120 may be introduced into the heater core 210 along the third coolant line 202.

Here, the high-temperature second coolant introduced into the heater core 210 may increase the temperature of the ambient air passing through the heater core 210. In other words, the introduced ambient air may be converted to a high-temperature state while passing through the heater core 210 and then introduced into the vehicle interior, thereby implementing heating of the vehicle interior.

In addition, the coolant having passed through the heater core 210 may be introduced into the first heat-exchanger 120 along the third coolant line 202.

In other words, while repeatedly performing above-described processes, the heat pump system may smoothly heat the vehicle interior by indirectly receiving the heat stored in the heat storage device 22 through the air conditioner unit 100.

The first mode may be operated when the temperature of the phase-change material stored in the heat storage device 22 is higher than a heating target temperature.

Meanwhile, in the first mode, when the temperature of the air discharged into the vehicle interior is lower than the heating target temperature, the coolant heater 25 may be operated to heat the first coolant circulating along the second coolant line 21 and the first connection line 31.

In other words, the coolant heater 25 may further increase the temperature of the first coolant such that the air conditioner unit 100 may recollect a large amount of heat to enable the temperature of the first coolant satisfy the heating target temperature.

In a heat pump system for a vehicle according to an embodiment, the operation in the second mode for supplying the waste heat of the electrical component 13 and the heat stored in the heat storage device 22 to the air conditioner unit 100 and for heating the vehicle interior by using the heat supplied from the air conditioner unit 100 is described with reference to FIG. 3.

Figure 3:
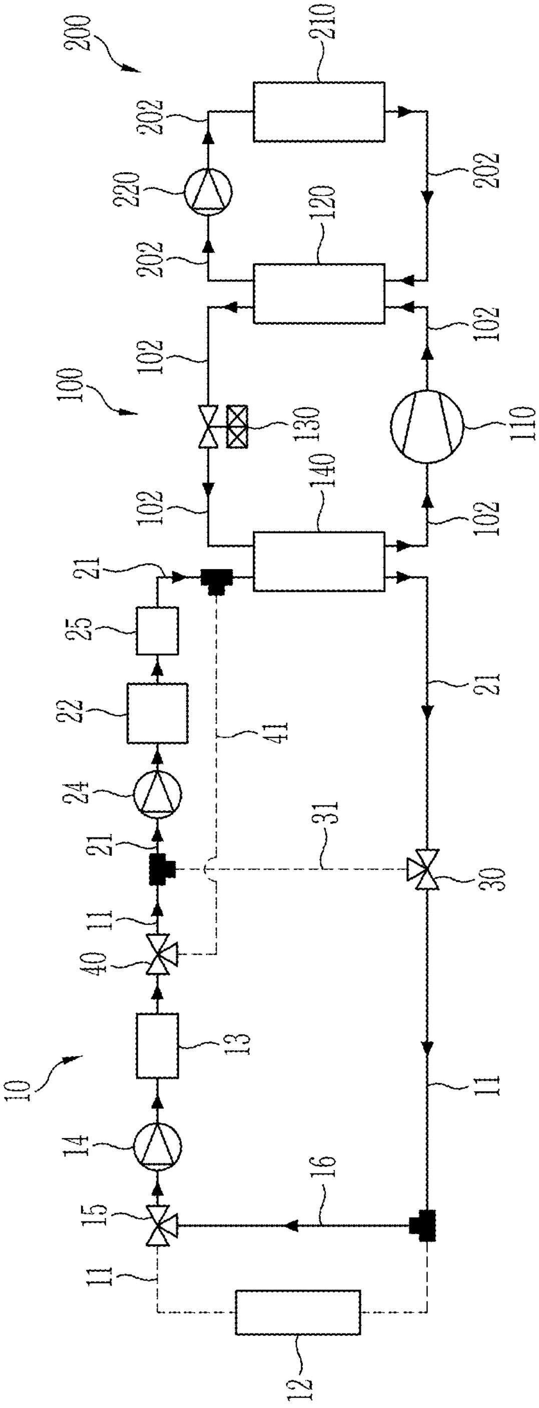
FIG. 3 is an operation diagram of a second mode in a heat pump system for a vehicle according to an embodiment.

FIG. 3 is an operation diagram of the second mode in a heat pump system for a vehicle according to an embodiment.

Referring to FIG. 3, in the second mode, the partial first coolant line 11 connected to the radiator 12 may be closed by the operation of the first valve 15 such that the first coolant may not flow to the radiator 12. Accordingly, the first coolant may not be introduced into the radiator 12.

Simultaneously, the branch line 16 may be opened by the operation of the first valve 15. In addition, the first coolant line 11 and the second coolant line 21 may be interconnected by the operation of the third valve 40 and second valve 30.

Here, the first connection line 31 may be closed by the operation of the second valve 30. In addition, the fourth connection line 115 may be closed by the operation of the second valve V2.

Then, the first coolant line 11 and the second coolant line 21 may be interconnected through the opened branch line 16 and may form an independent closed circuit through which the first coolant circulates.

In such a state, the first water pump 14 and the second water pump 24 may operate such that the first coolant may circulate along the branch line 16, the opened first coolant line 11, and the second coolant line 21.

In the air conditioner unit 100, the compressor 110 may operate such that the refrigerant may circulate along the refrigerant line 102.

Simultaneously, in the vehicle interior heating device 200, the third water pump 220 may operate such that the second coolant may flow along the third coolant line 202.

Then, the waste heat of the electrical component 13 and the heat stored in the heat storage device 22 may increase the temperature of the first coolant flowing along the first coolant line 11, the branch line 16, and the second coolant line 21 that are interconnected with each other.

In other words, the first coolant may absorb the waste heat of the electrical component 13 while cooling the electrical component 13, and absorb heat from the heat storage device 22 while passing through the heat storage device 22, thereby increasing its temperature. Through such an operation, the first coolant, whose temperature is increased, may be supplied to the second heat-exchanger 140.

Here, the second heat-exchanger 140 recollect the waste heat of the electrical component 13 and the heat of the heat storage device 22 while evaporating the refrigerant supplied from the expansion valve 130 through heat-exchange with the first coolant introduced through the second coolant line 21.

The refrigerant evaporated at the second heat-exchanger 140 may be introduced into the compressor 110 along the refrigerant line 102. The introduced refrigerant may be compressed by the operation of the compressor 110.

The refrigerant compressed at the compressor 110 may be supplied to the first heat-exchanger 120. At this time, the first heat-exchanger 120 may increase the temperature of the second coolant by exchanging heat between the refrigerant and the second coolant introduced through the third coolant line 202 such that the high-temperature second coolant may be supplied to the heater core 210.

The second coolant, whose temperature is increased while passing through the first heat-exchanger 120, may be introduced into the heater core 210 along the third coolant line 202.

Here, the high-temperature second coolant introduced into the heater core 210 may increase the temperature of the ambient air passing through the heater core 210. In other words, the introduced ambient air may be converted to a high-temperature state while passing through the heater core 210 and then introduced into the vehicle interior, thereby implementing heating of the vehicle interior.

In addition, the coolant having passed through the heater core 210 may be introduced into the first heat-exchanger 120 along the third coolant line 202.

While repeatedly performing above-described processes, the heat pump system may smoothly heat the vehicle interior by indirectly receiving the waste heat of the electrical component 13 and the heat stored in the heat storage device 22 through the air conditioner unit 100.

The second mode may be operated when the temperature of the phase-change material stored in the heat storage device 22 is higher than the temperature of the first coolant discharged from the electrical component 13 and the temperature of the first coolant introduced into the radiator 12 is higher than the external temperature.

Meanwhile, in the second mode, when the temperature of the air discharged into the vehicle interior is lower than the heating target temperature, the coolant heater 25 may be operated to heat the first coolant circulating along the first coolant line 11, the branch line 16, and the second coolant line 21.

In other words, the coolant heater 25 may further increase the temperature of the first coolant such that the air conditioner unit 100 may recollect a large amount of heat to enable the temperature of the first coolant satisfy the heating target temperature.

In a heat pump system for a vehicle according to an embodiment, the operation in the third mode for supplying the ambient air heat, the waste heat of the electrical component 13, and the heat stored in the heat storage device 22 to the air conditioner unit 100, and for heating the vehicle interior by using the heat supplied from the air conditioner unit 100 will be described with reference to FIG. 4.

Figure 4:
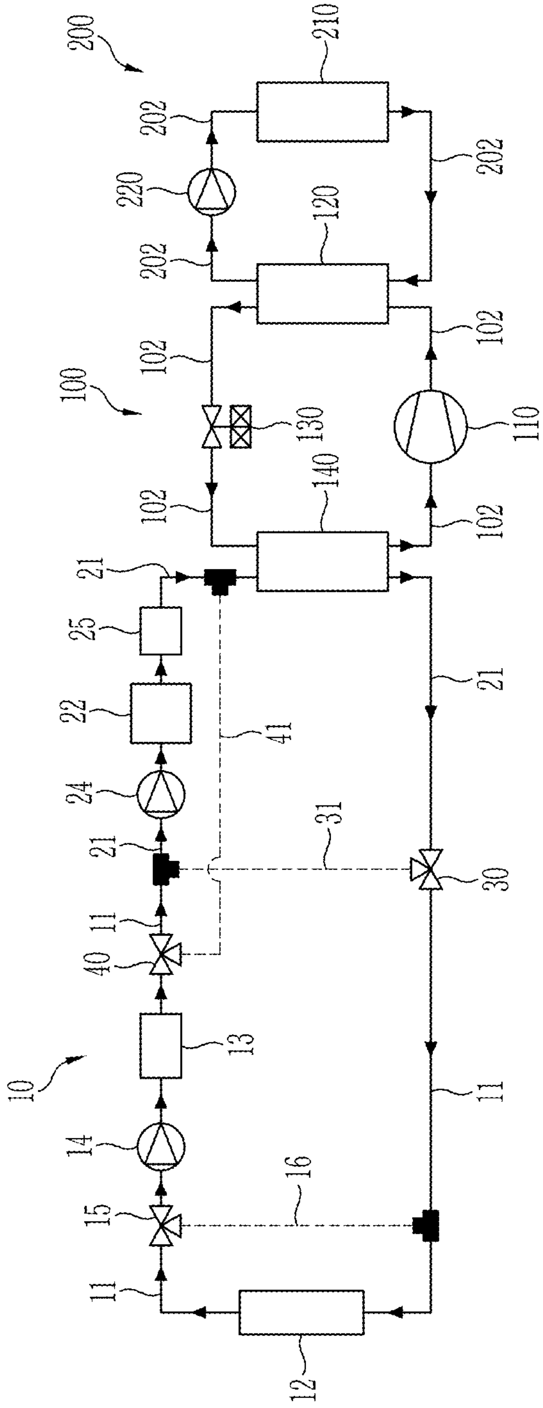
FIG. 4 is an operation diagram of a third mode in a heat pump system for a vehicle according to an embodiment.

FIG. 4 is an operation diagram of the third mode in a heat pump system for a vehicle according to an embodiment.

Referring to FIG. 4, in the third mode, the first coolant line 11 and the second coolant line 21 may be interconnected by the operation of the third valve 40 and second valve 30.

Simultaneously, the branch line 16 may be closed by the operation of the first valve 15. In addition, the first valve 15 may open the first coolant line 11 connecting the radiator 12 and the first water pump 14 such that the first coolant may circulate to the radiator 12.

Here, the first connection line 31 may be closed by the operation of the second valve 30. In addition, the second connection line 41 may be closed by the operation of the third valve 40.

In other words, the first coolant line 11 and the second coolant line 21 may be interconnected to form an independent closed circuit through which the first coolant circulates.

Accordingly, the radiator 12, the electrical component 13, and the heat storage device 22 may be interconnected with the first coolant line 11 through the second coolant line 21.

In such a state, the first water pump 14 and the second water pump 24 may operate such that the first coolant may circulate along the first coolant line 11 and the second coolant line 21.

Meanwhile, in the air conditioner unit 100, the compressor 110 may operate such that the refrigerant may circulate along the refrigerant line 102.

Simultaneously, in the vehicle interior heating device 200, the third water pump 220 may operate such that the second coolant may flow along the third coolant line 202.

Then, the ambient air heat absorbed at the radiator 12, the waste heat of the electrical component 13, and the heat stored in the heat storage device 22 may increase the temperature of the first coolant flowing along the first coolant line 11 and the second coolant line 21 interconnected with each other.

In other words, the first coolant may absorb the ambient air heat while passing through the radiator 12. At the same time, the first coolant may absorb the waste heat of the electrical component 13 while cooling the electrical component 13, and absorb heat from the heat storage device 22 while passing through the heat storage device 22, thereby increasing its temperature. Through such an operation, the first coolant whose temperature is increased may be supplied to the second heat-exchanger 140.

Here, the second heat-exchanger 140 may recollect the ambient air heat, the waste heat of the electrical component 13, and the heat of the heat storage device 22 while evaporating the refrigerant supplied from the expansion valve 130 through heat-exchange with the first coolant introduced via the second coolant line 21.

The refrigerant evaporated at the second heat-exchanger 140 may be introduced into the compressor 110 along the refrigerant line 102. The introduced refrigerant may be compressed by the operation of the compressor 110.

The refrigerant compressed at the compressor 110 may be supplied to the first heat-exchanger 120. At this time, the first heat-exchanger 120 may increase the temperature of the second coolant by exchanging heat between the refrigerant and the second coolant introduced through the third coolant line 202 such that the high-temperature second coolant may be supplied to the heater core 210.

The second coolant, whose temperature is increased while passing through the first heat-exchanger 120, may be introduced into the heater core 210 along the third coolant line 202.

Here, the high-temperature second coolant introduced into the heater core 210 may increase the temperature of the ambient air passing through the heater core 210. In other words, the introduced ambient air may be converted into the high-temperature state while passing through the heater core 210 and then introduced into the vehicle interior, thereby achieving heating of the vehicle interior.

In addition, the coolant having passed through the heater core 210 may be introduced into the first heat-exchanger 120 along the third coolant line 202.

In other words, while repeatedly performing above-described processes, the heat pump system may smoothly heat the vehicle interior by indirectly receiving the ambient air heat, the waste heat of the electrical component 13, and the heat stored in the heat storage device 22 through the air conditioner unit 100.

The third mode may be operated when the temperature of the heat storage device 22 is higher than the temperature of the first coolant discharged from the electrical component 13 and the temperature of the first coolant introduced into the radiator 12 is lower than the external temperature.

Meanwhile, in the third mode, when the temperature of the air discharged into the vehicle interior is lower than the heating target temperature, the coolant heater 25 may be operated to heat the first coolant circulating along the first coolant line 11 and the second coolant line 21.

In other words, the coolant heater 25 may further increase the temperature of the first coolant such that the air conditioner unit 100 may recollect a large amount of heat to enable the temperature of the first coolant satisfy the heating target temperature.

In a heat pump system for a vehicle according to an embodiment, the operation in the fourth mode for supplying the waste heat of the electrical component 13 to the air conditioner unit 100 and for heating the vehicle interior by using the heat supplied from the air conditioner unit 100 is described with reference to FIG. 5.

Figure 5:
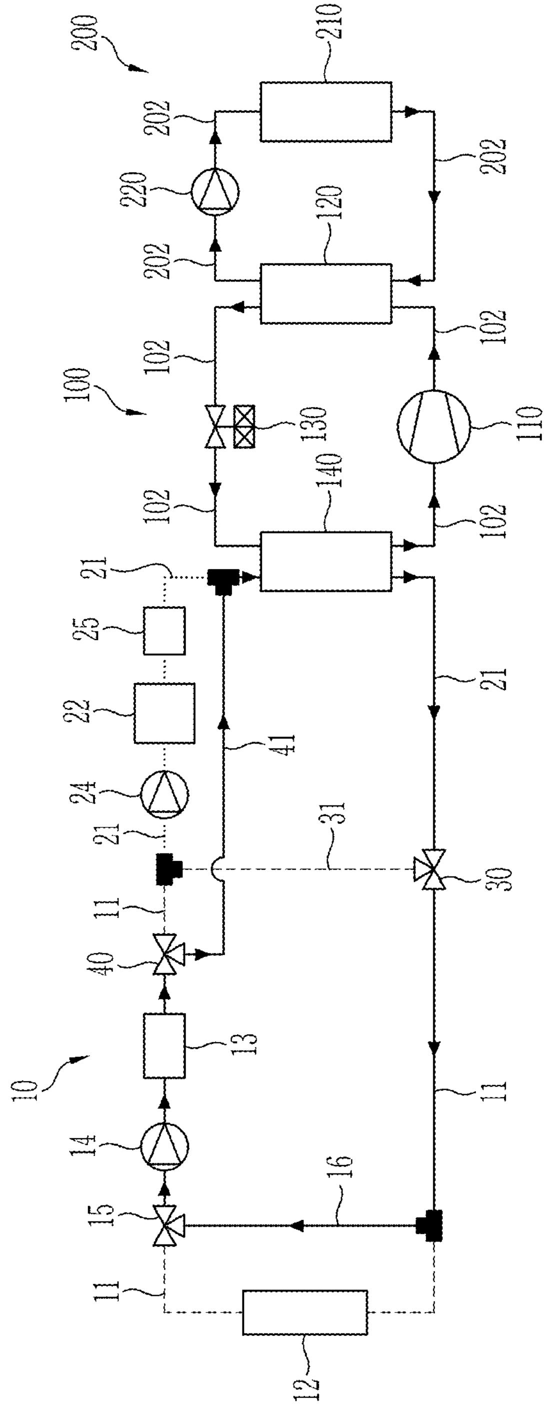
FIG. 5 is an operation diagram of a fourth mode in a heat pump system for a vehicle according to an embodiment.

FIG. 5 is an operation diagram of the fourth mode in a heat pump system for a vehicle according to an embodiment.

Referring to FIG. 5, in the fourth mode, the partial first coolant line 11 connected to the radiator 12 may be closed by the operation of the first valve 15 such that the first coolant may not flow to the radiator 12. Accordingly, the first coolant may not be introduced into the radiator 12.

Simultaneously, the branch line 16 may be opened by the operation of the first valve 15.

Meanwhile, the partial second coolant line 21 connected to the second heat-exchanger 140 may be opened by the operation of the second valve 30 to be connected to the first coolant line 11.

In addition, the partial first coolant line 11 and the second coolant line 21 that connect from the third valve 40 to the second end of the second connection line 41 may be closed by the operation of the third valve 40.

In such a state, operation of the second water pump 24 may be stopped. Accordingly, the first coolant may not flow to the heat storage device 22.

Here, the first connection line 31 may be closed by the operation of the second valve 30. In addition, the second connection line 41 may be opened by the operation of the third valve 40.

Then, the partial first coolant line 11 and the partial second coolant line 21 may be interconnected with the branch line 16 through the second connection line 41, and may form an independent closed circuit through which the first coolant circulates.

In such a state, the first water pump 14 may be operated such that the first coolant may circulate along the opened first coolant line 11, the opened second coolant line 21, the branch line 16, and the second connection line 41.

In the air conditioner unit 100, the compressor 110 may operate such that the refrigerant may circulate along the refrigerant line 102.

Simultaneously, in the vehicle interior heating device 200, the third water pump 220 may operate such that the second coolant may flow along the third coolant line 202.

Then, the waste heat of the electrical component 13 may increase the temperature of the first coolant flowing along the opened first coolant line 11, the opened second coolant line 21, the branch line 16, and the second connection line 41 that are interconnected with each other.

In other words, the first coolant may absorb the waste heat of the electrical component 13 while cooling the electrical component 13, thereby increasing its temperature. Through such an operation, the first coolant whose temperature is increased may be supplied to the second heat-exchanger 140.

Here, the second heat-exchanger 140 may recollect the waste heat of the electrical component 13 while evaporating the refrigerant supplied from the expansion valve 130 through heat-exchange with the first coolant introduced through the second coolant line 21.

The refrigerant evaporated at the second heat-exchanger 140 may be introduced into the compressor 110 along the refrigerant line 102. The introduced refrigerant may be compressed by the operation of the compressor 110.

The refrigerant compressed at the compressor 110 may be supplied to the first heat-exchanger 120. At this time, the first heat-exchanger 120 may increase the temperature of the second coolant by exchanging heat between the refrigerant and the second coolant introduced through the third coolant line 202 such that the high-temperature second coolant may be supplied to the heater core 210.

The second coolant, whose temperature is increased while passing through the first heat-exchanger 120, may be introduced into the heater core 210 along the third coolant line 202.

Here, the high-temperature second coolant introduced into the heater core 210 may increase the temperature of the ambient air passing through the heater core 210. In other words, the introduced ambient air may be converted into the high-temperature state while passing through the heater core 210 and then introduced into the vehicle interior, thereby achieving heating of the vehicle interior.

In addition, the coolant having passed through the heater core 210 may be introduced into the first heat-exchanger 120 along the third coolant line 202.

In other words, while repeatedly performing above-described processes, the heat pump system may smoothly heat the vehicle interior by indirectly receiving the waste heat of the electrical component 13 through the air conditioner unit 100.

The fourth mode may be operated when heat stored in the heat storage device 22 is completely exhausted, or when the temperature of the heat storage device 22 is lower than the temperature of the first coolant discharged from the electrical component 13 and the temperature of the first coolant introduced into the radiator 12 is higher than the external temperature.

In a heat pump system for a vehicle according to an embodiment, the operation in the fifth mode for supplying the ambient air heat and the waste heat of the electrical component 13 to the air conditioner unit 100 and for heating the vehicle interior by using the heat supplied from the air conditioner unit 100 is described with reference to FIG. 6.

Figure 6:
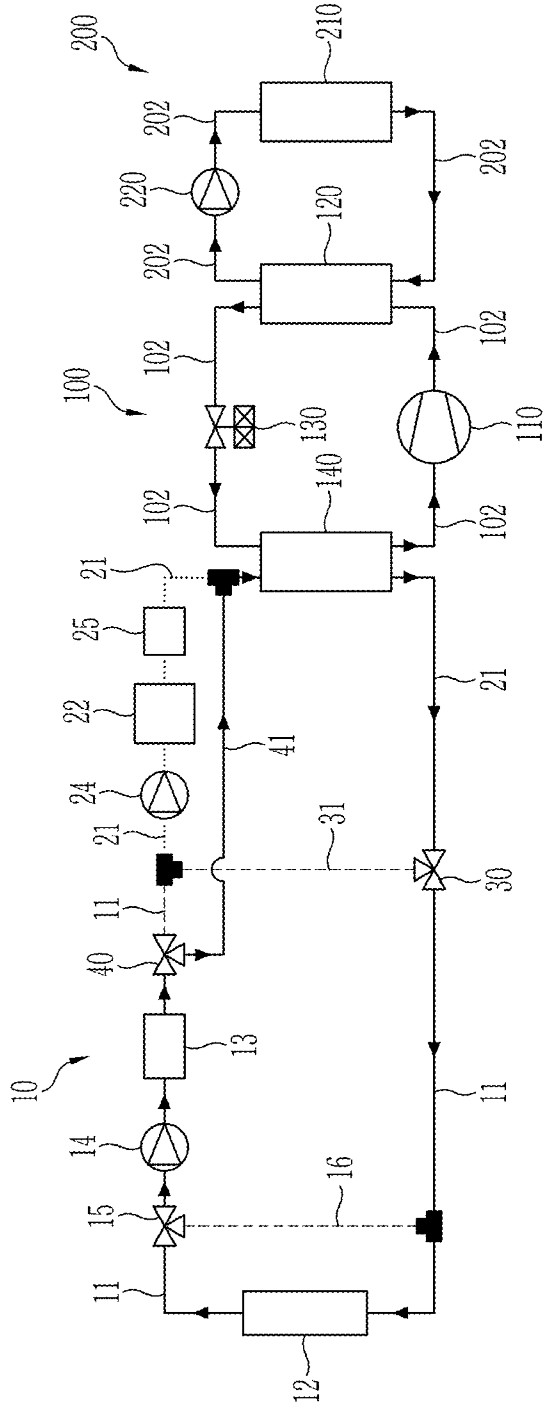
FIG. 6 is an operation diagram of a fifth mode in a heat pump system for a vehicle according to an embodiment.

FIG. 6 is an operation diagram of the fifth mode in a heat pump system for a vehicle according to an embodiment.

Referring to FIG. 6, in the fifth mode, the partial second coolant line 21 connected to the second heat-exchanger 140 may be opened by the operation of the second valve 30 to be connected to the first coolant line 11.

In addition, the partial first coolant line 11 and the second coolant line 21 that connect from the third valve 40 to the second end of the second connection line 41 may be closed by the operation of the third valve 40.

In such a state, operation of the second water pump 24 may be stopped. Accordingly, the first coolant may not flow to the heat storage device 22.

Here, the branch line 16 may be closed by the operation of the first valve 15. In addition, the first valve 15 may open the first coolant line 11 connecting the radiator 12 and the first water pump 14 such that the first coolant may circulate to the radiator 12.

Here, the first connection line 31 may be closed by the operation of the second valve 30. In addition, the second connection line 41 may be opened by the operation of the third valve 40.

Then, the first coolant line 11 and the partial second coolant line 21 may be interconnected with each other through the second connection line 41, and may form an independent closed circuit through which the first coolant circulates.

In such a state, the first water pump 14 may operate such that the first coolant may circulate along the first coolant line 11, the opened second coolant line 21, and the second connection line 41.

In the air conditioner unit 100, the compressor 110 may operate such that the refrigerant may circulate along the refrigerant line 102.

Simultaneously, in the vehicle interior heating device 200, the third water pump 220 may operate such that the second coolant may flow along the third coolant line 202.

Then, the ambient air heat absorbed at the radiator 12 and the waste heat of the electrical component 13 may increase the temperature of the first coolant flowing along the first coolant line 11, the opened second coolant line 21, and the second connection line 41.

In other words, the first coolant may absorb the ambient air heat while passing through the radiator 12. At the same time, the first coolant may absorb the waste heat of the electrical component 13 while cooling the electrical component 13, thereby increasing its temperature. Through such an operation, the first coolant whose temperature is increased may be supplied to the second heat-exchanger 140.

Here, the second heat-exchanger 140 recollect the ambient air heat and the waste heat of the electrical component 13 while evaporating the refrigerant supplied from the expansion valve 130 through heat-exchange with the first coolant introduced through the second coolant line 21.

The refrigerant evaporated at the second heat-exchanger 140 may be introduced into the compressor 110 along the refrigerant line 102. The introduced refrigerant may be compressed by the operation of the compressor 110.

The refrigerant compressed at the compressor 110 may be supplied to the first heat-exchanger 120. At this time, the first heat-exchanger 120 may increase the temperature of the second coolant by exchanging heat between the refrigerant and the second coolant introduced through the third coolant line 202 such that the high-temperature second coolant may be supplied to the heater core 210.

The second coolant, whose temperature is increased while passing through the first heat-exchanger 120, may be introduced into the heater core 210 along the third coolant line 202.

Here, the high-temperature second coolant introduced into the heater core 210 may increase the temperature of the ambient air passing through the heater core 210. In other words, the introduced ambient air may be converted into the high-temperature state while passing through the heater core 210 and then introduced into the vehicle interior, thereby heating the vehicle interior.

In addition, the coolant having passed through the heater core 210 may be introduced into the first heat-exchanger 120 along the third coolant line 202.

In other words, while repeatedly performing above-described processes, the heat pump system may smoothly heat the vehicle interior by indirectly receiving the ambient air heat and the waste heat of the electrical component 13 through the air conditioner unit 100.

The fifth mode may be operated when heat stored in the heat storage device 22 is completely exhausted, or when the temperature of the heat storage device 22 is lower than the temperature of the first coolant discharged from the electrical component 13 and the temperature of the first coolant introduced into the radiator 12 is lower than the external temperature.

In addition, in a heat pump system for a vehicle according to an embodiment, the operation in the sixth mode for storing heat in the heat storage device 22 is described with reference to FIG. 7.

Figure 7:
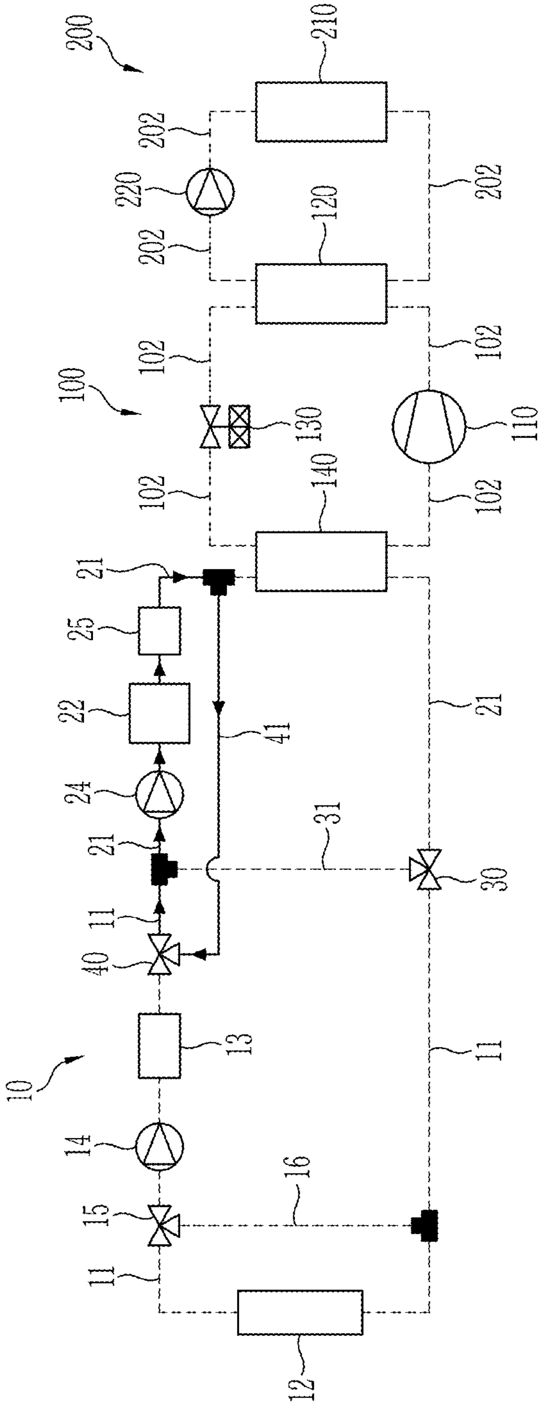
FIG. 7 is an operation diagram of a sixth mode in a heat pump system for a vehicle according to an embodiment.

FIG. 7 is an operation diagram of the sixth mode in a heat pump system for a vehicle according to an embodiment.

Referring to FIG. 7, in the sixth mode, the partial first coolant line 11 and the partial second coolant line 21 connecting from the third valve 40 to the second end of the second connection line 41 may be opened by the operation of the third valve 40.

Simultaneously, the partial second coolant line 21 connected to the second heat-exchanger 140, the first coolant line 11 connecting the radiator 12 and the second valve 30, and the first coolant line 11 connecting the radiator 12 and the third valve 40 may be closed.

In addition, the branch line 16 may be closed by the operation of the first valve 15.

The first connection line 31 may be closed by the operation of the second valve 30. In addition, the second connection line 41 may be opened by the operation of the third valve 40.

Here, the operation of the first water pump 14 may be stopped such that the first coolant may not flow along the first coolant line 11.

In addition, the second water pump 24 may operate such that the first coolant may circulate along the opened second coolant line 21 and the second connection line 41.

Meanwhile, in the air conditioner unit 100, the operation of the compressor 110 may be stopped such that the refrigerant may not flow along the refrigerant line 102.

In addition, an operation of the vehicle interior heating device 200 may be stopped.

Then, the first coolant may flow along the partial first coolant line 11, the partial second coolant line 21, and the second connection line 41 that are interconnected by an operation of the second water pump 24.

In such a state, the coolant heater 25 may be operated to increase the temperature of the first coolant.

Accordingly, the temperature of the first coolant may be increased while passing through the coolant heater 25. The first coolant whose temperature is increased may be introduced into the third valve 40 along the second coolant line 21 and the second connection line 41.

The first coolant introduced into the third valve 40 may be introduced into the heat storage device 22 along the partial first coolant line 11 and the second coolant line 21.

At this time, the heat storage device 22 may recollect and store heat from the first coolant whose temperature is increased.

By repeatedly performing such operations, the phase-change material filled in the heat storage device 22 may efficiently store heat. The heat stored in the phase-change material of the heat storage device 22 may be used to increase the temperature of the first coolant in the above-described the first to third modes.

Therefore, as described above, when a heat pump system for a vehicle according to an embodiment is applied, the temperature of the second coolant may be increased by using the heat supplied from the air conditioner unit 100 that absorbs at least one of the ambient air heat, the waste heat of the electrical component 13, or a heat supplied from the heat storage device 22, and the vehicle interior may be efficiently heated by using the second coolant whose temperature is increased.

In addition, according to the present disclosure, while reducing or minimizing the number of required components, the heating performance may be increased or maximized by selectively using the ambient air heat, the waste heat of the electrical component 13, and the heat stored in the heat storage device 22, and therefore, streamlining and simplification of the system may be achieved.

In addition, according to the present disclosure, since usage of the electric heater may be reduced or minimized at the time of heating the vehicle interior, the consumption of the battery may be reduced, and the overall travel distance of the vehicle may be increased.

In addition, according to the present disclosure, through streamlining of an entire system, it is possible to reduce manufacturing cost and weight and improve space utilization.

While this present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

DESCRIPTION OF SYMBOLS

10: electrical component cooling apparatus
11: first coolant line
12: radiator
13: electrical component
14: first water pump
15: first valve
16: branch line
21: second coolant line
22: heat storage device
24: second water pump
25: coolant heater
30: second valve
31: first connection line
40: third valve
41: second connection line
100: air conditioner unit
102: refrigerant line
110: compressor
120: first heat-exchanger
130: expansion valve
140: second heat-exchanger
200: vehicle interior heating device
202: third coolant line
210: heater core
220: third water pump

What is claimed is:

1. A heat pump system for a vehicle, comprising:

an electrical component cooling apparatus comprising:

a radiator, a first water pump connected via a first coolant line configured to flow a first coolant to cool an electrical component or recollect a waste heat of the electrical component, a heat storage device, and a second water pump connected to a second coolant line, wherein the second coolant line is selectively connected to the first coolant line and configured to flow the first coolant;

an air conditioner unit comprising:

a compressor, a first heat-exchanger, an expansion valve, and a second heat-exchanger connected to a refrigerant line configured to flow a refrigerant; and a vehicle interior heating device comprising a heater core and a third water pump connected to a third coolant line configured to flow a second coolant, wherein the first heat-exchanger is provided on the third coolant line and configured to flow the second coolant and condense the refrigerant through heat-exchange with the second coolant, wherein the second heat-exchanger is connected to the second coolant line and configured to flow the first coolant and evaporate the refrigerant through heat-exchange with the first coolant, wherein a flow of the first coolant is controlled based on at least one mode for storing heat in the heat storage device or heating a vehicle interior of the vehicle, and wherein the electrical component cooling apparatus further comprises:

a branch line connected to the first coolant line between the radiator and the first water pump through a first valve provided on the first coolant line between the radiator and the first water pump;

a second valve provided between the first coolant line and the second coolant line to selectively connect the first coolant line and the second coolant line;

a first connection line having a first end connected to the second valve and a second end connected to a location where the first coolant line and the second coolant line meet between the electrical component and the second water pump;

a third valve provided on the first coolant line at a downstream end of the electrical component; and a second connection line having a first end connected to the third valve, and a second end connected to the second coolant line between the heat storage device and the second heat-exchanger.

2. The heat pump system of claim 1, wherein, when a waste heat generated from the electrical component is sufficient, or when a temperature of the first coolant is to be increased by using both the waste heat of the electrical component and the heat of the heat storage device, the first valve is configured to close the first coolant line connected to the radiator and open the branch line.

3. The heat pump system of claim 1, wherein, when a temperature of the first coolant is to be increased by using the heat stored in the heat storage device, the second valve is configured to open the first connection line and close the first coolant line connecting the radiator and the second valve, such that the second coolant line forms an independent closed circuit through which the first coolant circulates through the first connection line.

4. The heat pump system of claim 1, wherein, when a temperature of the heat stored in the heat storage device is lower than a predetermined temperature, or when the heat storage device has completely exhausted the stored heat, the third valve is configured to open the second connection line and close a partial first coolant line and a partial second coolant line connecting the third valve and the heat storage device such that the first coolant does not flow to the heat storage device.

5. The heat pump system of claim 1, wherein the at least one mode comprises:

a first mode in which the heat stored in the heat storage device is supplied to the air conditioner unit and the vehicle interior is heated using the heat supplied from the air conditioner unit;

a second mode in which the waste heat of the electrical component and the heat stored in the heat storage device is supplied to the air conditioner unit and the vehicle interior is heated using the heat supplied from the air conditioner unit;

a third mode in which an ambient air heat, the waste heat of the electrical component, and the heat stored in the heat storage device is supplied to the air conditioner unit and the vehicle interior is heated using the heat supplied from the air conditioner unit;

a fourth mode in which the waste heat of the electrical component is supplied to the air conditioner unit and the vehicle interior is heated using the heat supplied from the air conditioner unit;

a fifth mode in which the ambient air heat and the waste heat of the electrical component is supplied to the air conditioner unit and the vehicle interior is heated using the heat supplied from the air conditioner unit; and a sixth mode in which heat is stored in the heat storage device.

6. The heat pump system of claim 5, wherein, in the first mode:

the first coolant line is not connected to the second coolant line by an operation of the second valve;

an operation of the first water pump is stopped such that the first coolant does not flow along the first coolant line;

the branch line is closed by an operation of the first valve;

the first connection line is opened by the operation of the second valve such that the second coolant line and the first connection line are interconnected to form an independent closed circuit through which the first coolant circulates;

the second connection line is closed by an operation of the third valve;

the second water pump is operated such that the first coolant flows along the second coolant line and the first connection line;

the air conditioner unit is operated;

the third water pump is operated such that the second coolant flows along the third coolant line;

the heat stored in the heat storage device increases a temperature of the first coolant flowing along the second coolant line and the first connection line;

the second heat-exchanger recollects the heat of the heat storage device while evaporating the refrigerant supplied from the expansion valve through heat-exchange with the first coolant introduced through the second coolant line; and the first heat-exchanger increases a temperature of the second coolant by exchanging heat between the refrigerant and the second coolant introduced through the third coolant line such that a high-temperature second coolant is supplied to the heater core.

7. The heat pump system of claim 5, wherein the first mode is operated when a temperature of the heat storage device is higher than a heating target temperature.

8. The heat pump system of claim 5, wherein, in the second mode:

a partial first coolant line is closed by an operation of the first valve connected to the radiator such that the first coolant does not flow to the radiator;

the branch line is opened by the operation of the first valve;

the first coolant line and the second coolant line are interconnected by an operation of the second valve and the third valve;

the first connection line is closed by an operation of the second valve;

the second connection line is closed by the operation of the third valve;

the first coolant line and the second coolant line are interconnected through the opened branch line to form an independent closed circuit through which the first coolant circulates;

the first water pump and the second water pump are operated such that the first coolant circulates along the branch line, the opened first coolant line, and the second coolant line;

the air conditioner unit is operated;

the third water pump is operated such that the second coolant flows along the third coolant line;

the waste heat of the electrical component and the heat stored in the heat storage device increase a temperature of the first coolant flowing along the opened first coolant line, the second coolant line, and the branch line;

the second heat-exchanger recollects the waste heat of the electrical component and the heat of the heat storage device while evaporating the refrigerant supplied from the expansion valve through heat-exchange with the first coolant introduced through the second coolant line; and the first heat-exchanger increases a temperature of the second coolant by exchanging heat between the refrigerant and the second coolant introduced through the third coolant line such that a high-temperature second coolant is supplied to the heater core.

9. The heat pump system of claim 5, wherein the second mode is operated when a temperature of the heat storage device is higher than the temperature of the first coolant discharged from the electrical component and the temperature of the first coolant introduced into the radiator is higher than an external temperature.

10. The heat pump system of claim 5, wherein, in the third mode:

the first coolant line and the second coolant line are interconnected by an operation of the second valve and the third valve;

the branch line is closed by an operation of the first valve;

the first connection line is closed by an operation of the second valve;

the second connection line is closed by the operation of the third valve;

the first water pump and the second water pump are operated such that the first coolant circulates along the first coolant line and the second coolant line;

the air conditioner unit is operated;

the third water pump is operated such that the second coolant flows along the third coolant line;

the ambient air heat absorbed at the radiator, the waste heat of the electrical component, and the heat stored in the heat storage device increase a temperature of the first coolant flowing along the opened first coolant line, the second coolant line, and the branch line;

the second heat-exchanger recollects the ambient air heat, the waste heat of the electrical component, and the heat of the heat storage device while evaporating the refrigerant supplied from the expansion valve through heat-exchange with the first coolant introduced through the second coolant line; and the first heat-exchanger increases a temperature of the second coolant by exchanging heat between the refrigerant and the second coolant introduced through the third coolant line such that a high-temperature second coolant is supplied to the heater core.

11. The heat pump system of claim 5, wherein the third mode is operated when a temperature of the heat storage device is higher than the temperature of the first coolant discharged from the electrical component and the temperature of the first coolant introduced into the radiator is lower than an external temperature.

12. The heat pump system of claim 5, wherein, in the fourth mode:

a partial first coolant line is closed by an operation of the first valve connected to the radiator such that the first coolant does not flow to the radiator;

the branch line is opened by the operation of the first valve;

a partial second coolant line connected to the second heat-exchanger is opened by an operation of the second valve to be connected to the first coolant line;

the partial first coolant line and the second coolant line connecting from the third valve to a second end of the second connection line are closed by an operation of the third valve;

the first connection line is closed by the operation of the second valve;

the second connection line is opened by the operation of the third valve;

the partial first coolant line and the partial second coolant line are interconnected with the branch line through the second connection line and form an independent closed circuit through which the first coolant circulates;

the first water pump is operated such that the first coolant circulates along the opened first coolant line, the opened second coolant line, the branch line, and the second connection line;

the air conditioner unit is operated;

the third water pump is operated such that the second coolant flows along the third coolant line;

the waste heat of the electrical component increases a temperature of the first coolant flowing along the opened first coolant line, the opened second coolant line, the branch line and the second connection line;

the second heat-exchanger recollects the waste heat of the electrical component while evaporating the refrigerant supplied from the expansion valve through heat-exchange with the first coolant introduced through the second coolant line; and the first heat-exchanger increases a temperature of the second coolant by exchanging heat between the refrigerant and the second coolant introduced through the third coolant line such that a high-temperature second coolant is supplied to the heater core.

13. The heat pump system of claim 5, wherein the fourth mode is operated when the heat stored in the heat storage device is completely exhausted, or when a temperature of the heat storage device is lower than the temperature of the first coolant discharged from the electrical component and the temperature of the first coolant introduced into the radiator is higher than an external temperature.

14. The heat pump system of claim 5, wherein, in the fifth mode:

a partial second coolant line connected to the second heat-exchanger is opened by an operation of the second valve to be connected to the first coolant line;

a partial first coolant line and the second coolant line connecting the third valve to a second end of the second connection line are closed by an operation of the third valve;

the branch line is closed by an operation of the first valve;

the first connection line is closed by the operation of the second valve;

the second connection line is opened by the operation of the third valve;

the first coolant line and the partial second coolant line are interconnected through the second connection line and form an independent closed circuit through which the first coolant circulates;

the first water pump is operated such that the first coolant circulates along the first coolant line, the opened second coolant line, and the second connection line;

the air conditioner unit is operated;

the third water pump is operated such that the second coolant flows along the third coolant line;

the ambient air heat absorbed at the radiator and the waste heat of the electrical component increase a temperature of the first coolant flowing along the first coolant line, the opened second coolant line, and the second connection line;

the second heat-exchanger recollects the ambient air heat and the waste heat of the electrical component while evaporating the refrigerant supplied from the expansion valve through heat-exchange with the first coolant introduced through the second coolant line; and the first heat-exchanger increases a temperature of the second coolant by exchanging heat between the refrigerant and the second coolant introduced through the third coolant line such that a high-temperature second coolant is supplied to the heater core.

15. The heat pump system of claim 5, wherein the fifth mode is operated when the heat stored in the heat storage device is completely exhausted, or when a temperature of the heat storage device is lower than the temperature of the first coolant discharged from the electrical component and the temperature of the first coolant introduced into the radiator is lower than an external temperature.

16. The heat pump system of claim 5, wherein, in the sixth mode:

a partial first coolant line and a partial second coolant line connecting the third valve to a second end of the second connection line are opened by an operation of the third valve;

the partial second coolant line connected to the second heat-exchanger, the first coolant line connecting the radiator and the second valve, and the first coolant line connecting the radiator and the third valve are closed;

the branch line is closed by an operation of the first valve;

the first connection line is closed by an operation of the second valve;

the second connection line is opened by the operation of the third valve;

an operation of the first water pump is stopped such that the first coolant does not flow along the first coolant line;

the second water pump is operated such that the first coolant circulates along the opened second coolant line and the second connection line;

an operation of the air conditioner unit is stopped; and an operation of the vehicle interior heating device is stopped.

17. The heat pump system of claim 16, wherein, when storing heat in the heat storage device is required, or when the heat stored in the heat storage device is insufficient in the at least one mode, a coolant heater is operated to heat the first coolant flowing along the second coolant line.

18. The heat pump system of claim 1, wherein the electrical component cooling apparatus further comprises a coolant heater provided on the second coolant line between the second water pump and the second heat-exchanger.

19. The heat pump system of claim 1, wherein the heat storage device is filled with a phase-change material.

* * * * *